Patented Apr. 24, 1945

2,374,379

UNITED STATES PATENT OFFICE 2,374,379

PROCESS FOR THE MANUFACTURE OF REDUCTION PRODUCTS FROM UNSATURATED FATTY ACIDS OR THEIR DERIVATIVES

Wilhelm Rittmeister, Rodleben, near Dessau-Rosslau, Germany, assignor, by mesne assignments, to American Hyalsol Corporation, Wilmington, Del., a corporation of Delaware No Drawing. Application September 5, 1940, Serial No. 355,456
In Germany September 5, 1939

15 Claims. (Cl. 260—638)

The present invention relates to a process for the manufacture of reduction products from unsaturated fatty acids or their derivatives.

An object of the instant invention is to produce unsaturated fatty alcohols from unsaturated fatty materials.

It is known that oleic alcohol may be obtained by the catalytic reduction of oleic acid esters. The catalysts to be considered for use in this process, which is performed without hydrogenating the olefinic double links, consist of mixtures of two or more elements of the second, sixth and seventh group of the periodical system. However, these mixed catalysts do not supply oleyl alcohol with an iodine number corresponding to that of oleic acid. The resulting products have the unsaturated links partially hydrogenated.

Another known process for the manufacture of higher molecular unsaturated aliphatic alcohols from the corresponding fatty acids by catalytic reduction uses a copper-cadmium catalyst. In this process for catalytically reducing unsaturated fatty acids, unsaturated alcohols with a comparatively high iodine number are obtained but considerable portions of esters from unsaturated fatty alcohols and unsaturated fatty acids are obtained also. These reduction products consequently must be saponified to obtain the formed unsaturated fatty alcohols and the portions of the unsaturated fatty acids which are not reduced must again be subjected to the reduction process.

Now it has been found that the unsaturated fatty acids or, respectively, their anhydrides or esters may be reduced in a single operation to products or a high iodine number which is approximately equal or even higher than that of the initial materials, provided mixed catalysts are used which contain both zinc or cadmium respectively and vanadium or compounds containing the aforesaid metals. In those mixed catalysts the ratio of vanadium to zinc or cadmium respectively may vary within rather large limits, and may be advantageously between 1:0.5 and 1:10. A ratio of vanadium to zinc or cadmium respectively within the limits 1:1 to 1:5 has proved to give the best results. The manufacture of the mixed catalysts may, in general, be performed in the usual way, e. g., by stirring zinc oxide or cadmium oxide respectively with ammonium vanadate in the presence of water to form a paste. This paste after drying forms hard and solid pieces which may be introduced into the reduction furnace where they operate without further treatment, at the temperatures required for the reduction of the unsaturated fatty acids or their derivatives, as very efficient and resistant catalysts.

The reduction of the unsaturated fatty acids, their anhydrides or esters is carried out in a well known way at temperatures exceeding 200° C. and preferably between 250 and 350° C. At temperatures below approximating, 300° C., the unsaturated fatty acids and their derivatives are reduced to unsaturated alcohols. Temperatures above approximating, 300° C., cause the reduction of certain portions of the initial materials even to the corresponding hydrocarbons while retaining the double links. In this way, the carboxyl group of unsaturated fatty acids, their anhydrides or esters, may be reduced to the alcohol or hydrocarbon stage while retaining any existing double link.

Instead of hydrogen, any gas containing hydrogen may likewise be used for the reduction. The reduction is advantageously carried out with an excess pressure, preferably between 20 and 500 atmospheres.

The described process is applicable, e. g., to oleic acid, undecylenic acid, train fatty acid, linoleic acid as well as their anhydrides or esters, and particularly to commercial products, such as olive oil, soya oil, cotton seed oil, rape seed oil, linseed oil, wood oil, sperm oil and the like.

The aforedescribed catalysts proved particularly useful for the reduction of the fatty materials in a continuous operation.

*Example 1*

Under a pressure of 50 atmospheres and at a temperature of 280° C., 50 g. of oleic acid butyl ester (iodine number 66) are conducted in the course of one hour together with 1 cubic meter of hydrogen over 200 cubic centimeters of a piece-formed catalyst consisting of zinc oxide and vanadium pentoxide in the mol ratio of 3:1 and prepared in the aforedescribed manner. The reaction product leaving the reaction room has, after cooling, a saponification number of 2 and an iodine number of 65.6 and supplies, after distilling off the butanol, an oleyl alcohol having an iodine number of 82 and an acetyl saponification number of 170.

*Example 2*

By reducing sperm oil, having an iodine number of 82. diluted with the same amount of butanol, with a zinc-vanadium catalyst (mol ratio 4:1), under the conditions indicated in Example 1, a fatty alcohol mixture having an iodine number of 79 is obtained after distilling off the solvent. If the reaction temperature is raised to about 340° C., a reaction product is obtained which possesses a saponification number of 0 and consists of unsaturated hydrocarbons having an iodine number of 91 mixed with only traces of unsaturated alcohols.

I claim:

1. Process for the manufacture of unsaturated reduction products characterized by conducting in a continuous operation a material of the group consisting of unsaturated fatty acids, unsaturated fatty acid anhydrides and unsaturated fatty acid esters with hydrogen at an elevated temperature of about 200° C. to 350° C. over a mixed catalyst containing metallic vanaduim and a member of the group consisting of metallic zinc and metallic cadmium.

2. Process for the manufacture of unsaturated reduction products characterized by conducting in a continuous operation a material of the group consisting of unsaturated fatty acids, unsaturated fatty acid anhydrides and unsaturated fatty acid esters with a hydrogen containing gas mixture at temperatures exceeding 200° and not exceeding 350° C. over a mixed catalyst containing a vanadium oxide and a metal oxide of the group consisting of zinc oxide and cadmium oxide.

3. Process for the manufacture of unsaturated reduction products characterized by conducting in a continuous operation an oleic acid ester with hydrogen at a temperature of 280° over a pieceformed catalyst consisting of zinc oxide and vanadium pentoxide.

4. In the production of unsaturated reduction products of fatty materials of the group consisting of unsaturated fatty acids, their esters and anhyrides by catalytic reduction at elevated temperatures, the improvement which comprises effecting the catalytic reduction with a mixed hydrogenation catalyst containing vanadium and a member of the group consisting of zinc and cadmium, the vanadium being present in a ratio ranging from 1:0.5 to 1:10 as compared to the other metal constituent of the mixed catalyst.

5. A process for the production of unsaturated reduction products of a fatty material of the group consisting of unsaturated fatty acids, their esters and anhydrides which comprises conducting said materials and hydrogen in a continuous operation, at an elevated temperature and pressure known to effect catalytic reduction of the carboxylic acid radical, over a mixed catalyst essentially containing only vanadium and a member of the group consisting of zinc and cadmium, the vanadium being present in a ratio ranging from 1:1 to 1:5 as compared to the other metal constituent of the mixed catalyst.

6. The process of claim 4 wherein the reduction temperature ranges from about 200° C. to about 300° C.

7. The process of claim 4 wherein the reduction temperature ranges from about 300° C. to about 350° C.

8. The process of claim 2 wherein the pressure ranges from about 20 to 500 atmospheres.

9. In the process of catalytically reducing the carboxyl group of an unsaturated fatty acid ester to the corresponding fatty alcohol at temperatures of about 200° C. to about 300° C. the improvement which comprises effecting the reduction with a mixed hydrogenation catalyst essentially containing vanadium and a member selected from the group consisting of zinc and cadmium.

10. In the process of catalytically reducing the carboxyl group of an unsaturated fatty acid ester to the corresponding unsaturated hydrocarbon at temperatures of about 300° C. to about 350° C., the improvement which comprises effecting the reduction with a mixed hydrogenation catalyst essentially containing vanadium and zinc.

11. The process of claim 2 wherein the fatty material is naturally occurring.

12. A hydrogenation catalyst for catalytically reducing a higher molecular fatty material of the group consisting of unsaturated fatty acids, their esters and anhydrides to their unsaturated reduction products comprising a mixed catalyst essentially containing only vanadium and a member of the group consisting of zinc and cadmuim, the vanadium being present in a ratio ranging from 1:0.5 to 1:10 as compared to the other metal constituent of the mixed catalyst.

13. A hydrogenation catalyst for catalytically reducing a higher molecular fatty material of the group consisting of unstaurated fatty acids, their esters and anhydrides to their unsaturated reduction products comprising a mixed catalyst essentially containing only vanadium and zinc, the vanadium being present in a ratio ranging from 1:1 to 1:5 as compared to the amount of zinc.

14. A process for producing unsaturated fatty alcohols from a composition consisting essentially of the esters of unsaturated fatty acids of 18 carbon atoms which comprises conducting said composition over a hydrogenation catalyst consisting of zinc oxide and vanadium pentoxide at a temperature of about 280° C. and a pressure of about 50 atmospheres.

15. A process for producing unsaturated hydrocarbons from the butyl esters of sperm oil which comprises conducting said esters over a zinc-vanadium catalyst at a temperature of about 340° C. and under a pressure of about 50 atmospheres.

WILHELM RITTMEISTER.